United States Patent Office 3,775,454
Patented Nov. 27, 1973

---

3,775,454
PREPARATION OF ORGANOLEAD-SILICON COMPOUNDS
Kenneth C. Williams and Shirl E. Cook, Baton Rouge, La., assignors to Ethyl Corporation, Richmond, Va.
No Drawing. Continuation-in-part of application Ser. No. 848,358, Aug. 7, 1969, now Patent No. 3,644,450, dated Oct. 3, 1967. This application June 4, 1971, Ser. No. 150,226
Int. Cl. C07f 7/24
U.S. Cl. 260—437 R                 9 Claims

ABSTRACT OF THE DISCLOSURE

A method of making alkyl lead-silicon compounds and derivatives thereof, wherein an organoleadmagnesium halide is prepared from a Grignard reagent (RMgX, wherein R is an organic radical and X a halogen) and a lead halide or lead carboxylate and then reacted with an organic silicon halide to form the alkyl lead-silicon compound, and such alkyl lead-silicon compounds.

CROSS REFERENCES TO RELATED APPLICATIONS

This application is a continuation-in-part of U.S. application Ser. No. 848,358, filed on Aug. 7, 1969, now U.S. Pat. No. 3,644,450.

BACKGROUND OF THE INVENTION

Field of the invention

The present invention relates broadly to the field of organolead compounds. It particularly relates to a method of making symmetrical and unsymmetrical organolead and di-lead compounds.

Description of the prior art

Organolead compounds are especially valuable as antiknock compounds in gasoline. Tetraalkylleads, principally tetraethyllead and tetramethyllead, have been widely used commercially for such purpose. Most of the methods of making organolead compounds result in the formation of free lead, which is undesirable both from a handling standpoint and an economic standpoint.

One of the most widely used laboratory methods of preparing tetraalkyllead compounds ($R_4Pb$) is from the reaction of lead chloride ($PbCl_2$) and an organomagnesium or other metal derivative (RM) in ether as follows:

$$4RM + 2PbCl_2 \xrightarrow[\text{ether}]{\text{heat}} R_4Pb + Pb + 4MCl$$

When using an alkyl magnesium halide, the foregoing equation encompasses the following steps:

(1)  $2RMgX + PbCl_2 \rightarrow R_2Pb + MgX_2 + MgCl_2$ (2)  $3RPb \rightarrow R_6Pb_2 + Pb$ (3)  $2R_6Pb \rightarrow 3R_4Pb + Pb$ Organolead metal compounds ($R_3Pb$-M) have been known for a number of years. Trialkylplumbylsodium and triarylplumbylsodium derivatives, triarylplumbyllithiums (namely, triphenylplumbyllithium) and triarylplumbylmagnesium bromides (namely trimesitylplumbylmagnesium bromide and triphenylplumbylmagnesium bromide) have been described in the literature. In 1939, H. Gilman and J. C. Bailie proposed the possible existence of a compound of the type $R_3PbMgBr$ in the reaction of triethyllead bromide and magnesium metal to produce tetraethyllead. No trialkylplumbylmagnesium halides have been subsequently reported.

SUMMARY OF THE INVENTION

It has been discovered that many new organolead-silicon compounds can be prepared using trialkylplumbyl-magnesium halide compounds and organic silicon halides. The trialkylplumbylmagnesium halide compounds may be first synthesized by reacting a Grignard reagent (RMgX) with a lead halide. The resulting mixture or the lead-magnesium complex is then reacted with an organic silicon halide to produce a unique organolead-silicon compound. These two reactions may be summarized as follows:

(1)  $3RMgX + PbX'_2 \rightarrow R_3PbMgX + MgX'_2 + MgX_2$ (2)  $R_3PbMgX + R_3Si(CH_2)_yX \rightarrow$
$$R_3Pb(CH_2)_ySiR_3 + MgX_2$$

wherein

R=any organic radical
X=a halogen
X'=a halogen or carboxylate
y=integer from 1 to 5

The reactions are carried out in the presence of a catalyst and/or solvent which is an ether more basic than diethyl ether. Tetrahydrofuran (THF) is a preferred solvent and/or catalyst.

The reaction is also carried out at a temperature of from about −10° C. to about 30° C. Low temperatures are preferred, and optimum results are obtained at a temperature of about 5° C.

The reaction may also be carried out in a one step reaction wherein a Grignard reagent and an organo silicon polyhalide are mixed together in a catalyst or solvent and subsequently a lead halide or lead carboxylate is added to the mixture. This reaction is summarized as follows:

$3RMgX + R_3Si(CH_2)_yX + PbX'_2 \rightarrow$
$$R_3Pb(CH_2)_ySiR_3 + 2MgX_2 + MgX'_2$$

wherein

R=any organic radical
X=a halogen
X'=a halogen or carboxylate
y=integer from 1 to 10

The catalyst and the temperature conditions are the same as for the foregoing reactions.

It is a primary object of the present invention to provide a new and novel method of preparing lead alkyls and lead alkyl derivatives for use as gasoline antiknock compounds.

Another important object of the present invention is to provide a new and improved method of making organolead-silicon compounds wherein no by-product lead metal is formed.

Another principal object of the present invention is to provide new and unique organolead-silicon compounds.

Other objects and advantages of the present invention will become more readily apparent from a reading of the description and claims hereinafter.

DESCRIPTION OF THE PREFERRED EMBODIMENT

In one preferred form of the invention, an organolead-magnesium chloride is prepared from a Grignard reagent (EtMgCl or MeMgCl) and lead chloride and then reacted with chloromethyl trimethyl silane. The reaction is carried out using tetrahydrofuran (THF) as a catalyst or solvent at a temperature of 5° C. The reaction steps may be summarized as follows:

(1) $3CH_3CH_2MgCl + PbCl_2 \xrightarrow{\text{THF}} (CH_3CH_2)_3PbMgCl + 2MgCl_2$ (2) $(CH_3CH_2)_3PbMgCl + (CH_3)_3SiCH_2Cl \longrightarrow$
$$(CH_3CH_2)_3Pb-CH_2-Si(CH_3CH_2)_3 + MgCl_2$$

The reaction may also be carried out as a one step reaction as follows:

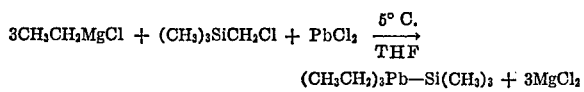

$$(CH_3CH_2)_3Pb-Si(CH_3)_3 + 3MgCl_2$$

In this reaction, the lead salt is added to a solution containing both the Grignard reagent and the organo silicon polyhalide.

Lead acetate may be substituted for lead chloride and a number of organoleadmagnesium salts may be obtained by varying the lead salt and the organo radical of the Grignard reagent.

When preparing trialkylplumbylmagnesium chloride, it is necessary that the lead salt be added to the Grignard reagent to prevent the formation of free lead metal. By varying the reactant, numerous organolead compounds are synthesized.

Table I hereinafter illustrates the products formed by reacting trialkylplumbylmagnesium chlorides with an organo silicon halide and the yield thereof:

TABLE I

| $R_3PbMgCl$ | Reactant | Product | Yield |
|---|---|---|---|
| $(C_2H_5)_3PbMgCl$ | $(CH_3)_3SiCH_2Cl$ | $(C_2H_5)_3Pb-CH_2-Si(CH_3)_3$ | 73 |
| $(CH_3)_3PbMgCl$ | $(CH_3)_3SiCH_2Cl$ | $(CH_3)_3Pb-CH_2-Si(CH_3)_3$ | 70 |

The process of this invention and the new compounds produced thereby may be more completely understood and illustrated by the following examples.

GENERAL PROCEDURE

All reactions were carried out under a nitrogen atmosphere. Tetrahydrofuran (THF) was distilled from lithium aluminum hydride before use. Anhydrous lead acetate was obtained by heating the trihydrate at 110° C. for several hours under a vacuum or removal of the water of hydration by azeotropic distillation with toluene.

The reactions were performed in a 500 ml. or 1000 ml. three-necked round-bottom flask equipped with condenser (Dewar filled with Dry Ice-acetone) and magnetic or paddle stirrer. The lead salt was added from a 50 ml. round-bottom flask connected to the reaction vessel by a short piece of Gooch tubing. The Grignard reagents were prepared from magnesium turnings and a slight excess of the alkyl halide. The excess alkyl halide was then removed by heating at reflux for a few minutes under a nitrogen flush.

Lead contents of the new organolead derivatives were determined by reaction with bromine in carbon tetrachloride, destruction with nitric and perchloric acid and titration with EDTA to the endpoint using xylenol orange as indicator.

During the hydrolysis of the reaction mixtures enough dilute HCl was added to solubilize the precipitated magnesium salts.

Triethylplumbylmagnesium chloride or trimethylplumbylmagnesium chloride was prepared as follows: A Grignard solution prepared from 8.0 g. (0.33 g.-atom) of magnesium and an equivalent amount of methyl chloride or ethyl chloride in 400 ml. of THF was treated slowly at 5° C. with 27.8 g. (0.1 m.) of lead chloride. Greenish-brown and homogeneous solutions containing the complexes were obtained. Derivatives of the compounds were prepared as described in the examples hereinafter.

EXAMPLE I (Triethylplumbyl) (trimethylsilyl)methane

Triethylplumbylmagnesium chloride was prepared from 16.0 g. (0.66 g.-atom) of magnesium, an equivalent amount of ethyl chloride and 55.6 g. (0.2 m.) of lead chloride at 5° C. in 900 ml. of THF. To the solution was added 25 g. (0.2 m.) of chloromethyltrimethylsilane. The mixture was warmed to ambient temperature and stirred for 30 minutes and at 50° C. for 10 minutes. The mixture was hydrolyzed with 300 ml. of water and the THF was removed by distillation. The organolead product was separated from the aqueous layer and washed several times with water. Vacuum distillation gave 55.3 g. (73 percent) of colorless product boiling at 57–59° C. (0.5 mm.).

*Analysis.*—Calcd. for $C_{20}H_{26}SiPb$: Pb, 54.29%. Found: Pb, 54.69%.

EXAMPLE II (Trimethylplumbyl) (trimethylsilyl)methane

Trimethylplumbylmagnesium chloride was prepared from 8.0 g. (0.33 g.-atom) of magnesium, an equivalent amount of methyl chloride and 27.8 g. (0.1 ml.) of lead chloride as described above at 5° C. To the solution was added 12.2 g. (0.1 m.) of chloromethyltrimethylsilane. The ice bath was removed and the solution was warmed to ambient temperature and stirred for 25 minutes. The greenish-brown color disappeared and a gelatinous precipitate was formed. The mixture was hydrolyzed with 300 ml. of water and the THF was removed by distillation. The heavy organolead product was separated from the aqueous layer and washed several times with water. Vacuum distillation gave 23.6 g. (70 percent) of colorless product boiling at 34–35° C. (0.3 mm.).

*Analysis.*—Calcd. for $C_7H_{20}SiPb$: Pb, 61.02%. Found: Pb, 60.83%.

Halogens suitable for use in the instant invention wherever a halogen is called for, are chlorine, bromine and iodine.

Carboxylates suitable for use in the instant invention are those having the formula RCOO, wherein R=hydrogen, alkyl group, halogen-substituted alkyl group, hydroxy-substituted alkyl group, oxy-substituted alkyl group, thio-substituted alkyl group, cyano-substituted alkyl group, aryl group, ethylenic-substituted alkyl group, and carboxy acid-substituted alkyl group.

Some examples of lead carboxylates are lead acetate, lead citrate, lead propionate, lead chloroacetate, lead chlorocitrate, lead glycollate, lead 2-hydroxypropionate, lead methylglycolate, lead thioacetate, lead thiocitrate, lead cyanoacetate, lead cyanocitrate, lead benzoate, lead acrylate and lead malonate.

Some examples of organo-silicon halides or halogenated silanes suitable as reactants in the method of the present invention are: chloromethyltrimethyl silane, chloroethyltrimethyl silane, chloropropyltrimethyl silane, dichloromethyltriethyl silane, chloroethyltriethyl silane, chloromethyltripropyl silane, chloroethyltripropyl silane, bromomethyltriethyl silane and iodomethyltriethyl silane.

The products of this invention possess considerable utility. These compositions are soluble in hydrocarbons and are valuble as antiknock compositions for gasolines.

The foregoing disclosure and description of the invention is illustrative and explanatory thereof and various changes may be made within the scope of the appended claims without departing from the spirit of the invention.

What is claimed is:

1. A method of making lead-silicon alkyl comprising the steps of reacting a lower alkykl Grignard reagent, a lead salt selected from the group consisting of lead halides and lead carboxylates, and a lower alkyl silicon halide of the formula $$R_3Si(CH_2)_yX$$

wherein:
R=a lower alkyl radical
X=a halogen selected from the group consisting of chlorine, bromine or iodine, and
Y=an integer from 1 to 10
said reaction being carried out in the presence of an ether more basic than diethyl ether.

2. A method of making lead-silicon alkyls comprising the steps of:
(a) reacting a lower alkyl Grignard reagent and a lead salt selected from the group consisting of lead chloride, lead bromide, lead iodide and lead carboxylates, said reaction being carried out in the presence of an ether more basic than diethyl ether, and
(b) reacting the lead-magnesium salt from the previous reaction with lower alkyl silicon halide of the formula $R_3Si(CH_2)_yX$, wherein:
R=a lower alkyl radical,
X=a halogen selected from the group consisting of chlorine, bromine or iodine, and
Y=an integer from 1 to 10 thereby forming a lead alkyl silicon compound, said reaction being carried out in the presence of an ether more basic than diethyl ether.

3. The method of claim 2, wherein the reactions are carried out in the presence of tetrahydrofuran.

4. The method of claim 2, wherein the reactions are carried out at a temperature of from about $-10°$ C. to about $30°$ C.

5. The method of claim 2, wherein the reactions are carried out at a temperature of about $5°$ C.

6. A method of preparing lead-silicon alkyls substantially in accordance with the following chemical reaction:

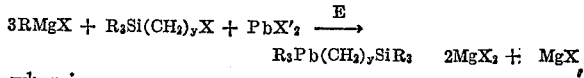

wherein:
R=a lower alkyl radical

X=a halogen selected from the group consisting of chlorine, bromine or iodine
X′=a halogen selected from the group consisting of chlorine, bromine, iodine or a carboxylate
y=an integer from 1 to 10
E=an ether more basic than diethyl ether.

7. The method of claim 6, wherein said ether is tetrahydrofuran.

8. A method of preparing lead-silicon alkyls substantially in accordance with the following chemical reactions in the order set forth:

(1) 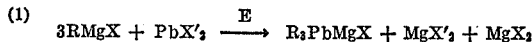

(2) 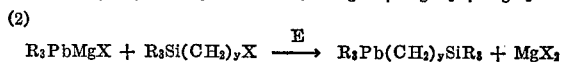

wherein:
R=a lower alkyl radical
X=a halogen selected from the group consisting of chlorine, bromine or iodine
X′=a halogen selected from the group consisting of chlorine, bromine or iodine
y=an integer from 1 to 5
E=an ether more basic than diethyl ether.

9. The method of claim 8, wherein said ether is tetrahydrofuran.

References Cited

Schmidbaur, Chem. Ber. vol. 97, pp. 270–281 (1964).

HELEN M. S. SNEED, Primary Examiner

PO-1050
(5/69)

UNITED STATES PATENT OFFICE
CERTIFICATE OF CORRECTION

Patent No. 3,775,454      Dated November 27, 1973

Inventor(s) Kenneth C. Williams and Shirl E. Cook

It is certified that error appears in the above-identified patent and that said Letters Patent are hereby corrected as shown below:

Column 1, line 56, in Formula (2), reads "$3RPb \rightarrow$", should read -- $3R_2Pb \rightarrow$ -- .

Column 1, line 59, in Formula (3), reads "$2R_6Pb \rightarrow$", should read -- $2R_6Pb_2 \rightarrow$ -- .

Column 2, line 36, reads "$R_3Pb(CH_2)_ySiR_3 + 2MgX_2 + MgX'$", should read -- $R_3Pb(CH_2)_ySiR_3 + 2MgX_2 + MgX'_2$ -- .

Column 2, line 71, reads "$(CH_3CH_2)_3Pb-CH_2-Si(CH_3CH_2)_3 + MgCl_2$", should read -- $(CH_3CH_2)_3Pb-CH_2-Si(CH_3)_3 + MgCl_2$ -- .

Column 4, line 14, reads "(0.1 ml.)", should read -- (0.1 m.) -- .

Column 4, line 61, reads "alkyl", should read -- alkyls -- .

Column 5, line 9, reads "with lower", should read -- with a lower -- .

Column 5, line 29, reads "$R_3Pb(CH_2)_ySiR_3 \quad 2MgX_2 + MgX$", should read -- $R_3Pb(CH_2)_ySiR_3 + 2MgX_2 + MgX'_2$ -- .

Signed and sealed this 16th day of April 1974.

(SEAL)
Attest:

EDWARD M.FLETCHER,JR.            C. MARSHALL DANN
Attesting Officer                  Commissioner of Patents